(12) United States Patent
Maheshwari et al.

(10) Patent No.: US 8,036,133 B2
(45) Date of Patent: Oct. 11, 2011

(54) EFFICIENT TECHNIQUES FOR ERROR DETECTION AND AUTHENTICATION IN WIRELESS NETWORKS

(75) Inventors: Shashikant Maheshwari, Irving, TX (US); Yogesh Swami, Irving, TX (US); Yousuf Saifullah, Richardson, TX (US)

(73) Assignee: Nokia Corporation, Espoo (FI)

( * ) Notice: Subject to any disclaimer, the term of this patent is extended or adjusted under 35 U.S.C. 154(b) by 863 days.

(21) Appl. No.: 12/041,564

(22) Filed: Mar. 3, 2008

(65) Prior Publication Data
US 2008/0220742 A1 Sep. 11, 2008

Related U.S. Application Data

(60) Provisional application No. 60/893,115, filed on Mar. 5, 2007.

(51) Int. Cl.
*H04L 12/28* (2006.01)
*H04L 12/56* (2006.01)
*H04L 29/06* (2006.01)
*H04L 9/32* (2006.01)
*G06F 11/00* (2006.01)
*H03M 13/03* (2006.01)

(52) U.S. Cl. ........ 370/242; 370/235; 713/161; 713/169; 713/170; 714/103; 714/148; 714/152; 714/746; 714/786

(58) Field of Classification Search ................. 370/235, 370/242; 713/160, 161, 168–170, 176; 714/100–106, 148, 152, 746–762, 774, 786–788
See application file for complete search history.

(56) References Cited

U.S. PATENT DOCUMENTS

| | | | |
|---|---|---|---|
| 6,348,875 B1 | 2/2002 | Odinak et al. | |
| 6,650,636 B1 | 11/2003 | Bradshaw et al. | |
| 6,845,449 B1 | 1/2005 | Carman et al. | |
| 7,155,658 B2 | 12/2006 | Huggman et al. | |
| 2010/0098109 A1* | 4/2010 | Le Pennec et al. | 370/477 |

OTHER PUBLICATIONS

"Application Serial No.PCT/IB2008/000484, International Search Report mailed Sep. 4, 2008", P220, 11 pgs.
Hong, H.Y., et al., ""Joint content authentication and error control for wireless multimedia communications"", Consumer Communications and Networking Conference,2004,CCNC 2004,First IEEE Jan. 5-8, 2004, (2004), pp. 412-417.
Bellare, Mihir et al., "Keying Hash Functions for Message Authenticaiton", Advances in Cryptology—Crypto 96 Proceedings Lecture Notes in Computer Science vol. 1109, N. Koblitz ed., Springer-Verlag, 1996, (Jun. 1996), 1-19.
"Part 16: Air Interface for Fixed and Mobile Broadband Wireless Access Systems"; Amendment 2: Physical and Medium Access Control Layers for Combined Fixed and Mobile Operation in Licensed Bands, IEEE Standard for Local and Metropolitan Area Networks; IEEE Computer Society and the Microwave Theory and Techniques Society; IEEE Std 802. 16e-2005 and IEEE Std 802. 16—2004/Cor1-2-5, (Feb. 28, 2006), 1-864.

* cited by examiner

*Primary Examiner* — Ronald Abelson
(74) *Attorney, Agent, or Firm* — Brake Hughes Bellermann LLP

(57) ABSTRACT

Various example embodiments are disclosed relating to efficient techniques for error detection and authentication in wireless networks. For example, according to an example embodiment, an apparatus adapted for wireless communication in a wireless network may include a processor. The processor may be configured to transmit a message including a field to provide both authentication and error detection for the message. The field may include an authenticated checksum sequence.

19 Claims, 11 Drawing Sheets

EFFICIENT TECHNIQUES FOR ERROR DETECTION AND AUTHENTICATION IN WIRELESS NETWORKS

CROSS REFERENCE TO RELATED APPLICATIONS

This application claims the benefit under 35 U.S.C. §119 (e) of U.S. Provisional Patent Application Ser. No. 60/893,115 filed on Mar. 5, 2007. The entire disclosure of U.S. Provisional Application 60/893,115 is incorporated by reference herein in its entirety.

BACKGROUND

A number of different wireless networks have been developed. One of the most common wireless technologies is wireless LAN (wireless local area network) or WLAN technology. An example WLAN technology is described in the Institute of Electrical and Electronics Engineers IEEE 802.11 family of industry specifications, such as specifications for IEEE 802.11b, IEEE 802.11g, IEEE 802.11a and 802.11n, etc. A number of different 802.11 task groups are involved in developing specifications relating to improvements to the existing 802.11 technology. Other wireless technologies are being developed, such as IEEE 802.16 or WiMAX technology. A variety of other wireless networks exist, such as cellular networks and the like.

Errors may sometimes be introduced during transmission via a wireless or other medium. A number of different techniques have been employed in attempt to detect errors. For example, a checksum is sometimes calculated and appended to a message at a transmitting node to allow a receiving node to detect errors in the received message.

Authentication is also sometimes employed to allow a receiving node to confirm that a received message was sent by an alleged sending node, and not sent from another node (e.g., an attacker or other node pretending to be the alleged sending node). A number of different security techniques have been employed to allow authentication of messages or between nodes.

Unfortunately, in some cases, techniques that attempt to provide error detection or authentication in networks may introduce significant overhead.

For example, in IEEE 802.16, error detection for a frame body may be provided by a one byte checksum. In addition, with respect to security or authentication, a Hashed Message Authentication Code and Cipher-based Message Authentication Code (HMAC/CMAC) tuple may be provided in some messages, which may introduce significant overhead for messages.

It may be desirable to provide more efficient techniques to provide error detection and/or authentication.

SUMMARY

Various example embodiments are disclosed relating to efficient techniques for error detection and authentication in wireless networks.

According to an example embodiment, an apparatus adapted for wireless communication in a wireless network may include a processor. The processor may be configured to transmit a message including a message body and a field to provide both authentication and error detection for the message body. The field may include an authenticated checksum sequence.

According to another example embodiment, a chipset may include a wireless transceiver, and a processor. The processor may be configured to transmit a message including a field to provide both authentication and error detection for the message. In an example embodiment, the processor may be configured to transmit a message including an authenticated checksum sequence (e.g., such as an authenticated header checksum sequence) to provide both authentication and error detection for the message.

According to another example embodiment, a method may include determining a message, where the message includes a message body and a field to provide both authentication and error detection for the message body. The method may also include transmitting the message to a wireless node. For example, the message may include a header, and the field may include an authenticated header checksum sequence. The authenticated header checksum sequence may be determined, for example, by determining a message digest over the header and a security key; and dividing the message digest by a generator polynomial to generate a residue. In the example method, the authenticated header checksum sequence may include the residue.

According to another example embodiment, an apparatus may include a processor configured to receive a message via a wireless link. The message may include a message body and a field, the field to provide both authentication and error detection for the message body.

According to another example embodiment, a method may include receiving a message, wherein the message includes a message body and a field (e.g., authenticated checksum sequence) to provide both authentication and error detection for the message body. The method may also include using the field to authenticate the message and to detect any errors in the message.

According to another example embodiment, an apparatus may include a processor. The processor may be configured to determine a security key associated with a wireless node, negotiate, with the wireless node, the use of an authenticated checksum sequence for one or messages, and receive a message from the wireless node. The message may include a message body and an authenticated checksum sequence to provide authentication and error detection for the message body. In an example embodiment, the authenticated checksum sequence may be based on the security key.

According to another example embodiment, a method may include determining a security key associated with a wireless node, negotiating, with the wireless node, the use of an authenticated checksum sequence for one or more messages, and receiving a message from the wireless node, the message including a message body and an authenticated checksum sequence to provide authentication and error detection for the message body. The authenticated checksum sequence may be, for example, based on the security key.

According to another example embodiment, an apparatus may include a wireless transceiver, and a processor. The processor may be configured to determine a security key, negotiate, with a wireless infrastructure node, the use of an authenticated checksum sequence for the transmission of one or messages to the infrastructure node, and transmit a message to the infrastructure node. The message may include a message body and an authenticated checksum sequence to provide authentication and error detection for the message body. The authenticated checksum sequence being based on the security key.

According to another example embodiment, an apparatus may include a wireless transceiver and a processor. The processor may be configured to receive a message via a wireless medium including a header and an authentication digest to provide authentication for the header.

In another example embodiment, a method may include determining a security key for a wireless node, and receiving a message from the wireless node, the message including a header and an authentication digest to provide authentication for the header, wherein the authentication digest is based on the security key.

In another example embodiment, an apparatus may include a wireless transceiver, and a processor. The processor may be configured to determine a security key for use in communicating with an infrastructure node, and transmit a message via a wireless medium to the infrastructure node, the message including a header and an authentication digest to provide authentication for the header, the authentication digest being based upon the security key.

In yet another example embodiment, a method may include determining a security key for use in communicating with an infrastructure node, and transmitting a message via a wireless medium to the infrastructure node, the message including a header and an authentication digest to provide authentication for the header, the authentication digest being based upon the security key.

The details of one or more implementations are set forth in the accompanying drawings and the description below. Other features will be apparent from the description and drawings.

DETAILED DESCRIPTION

Figure 1:
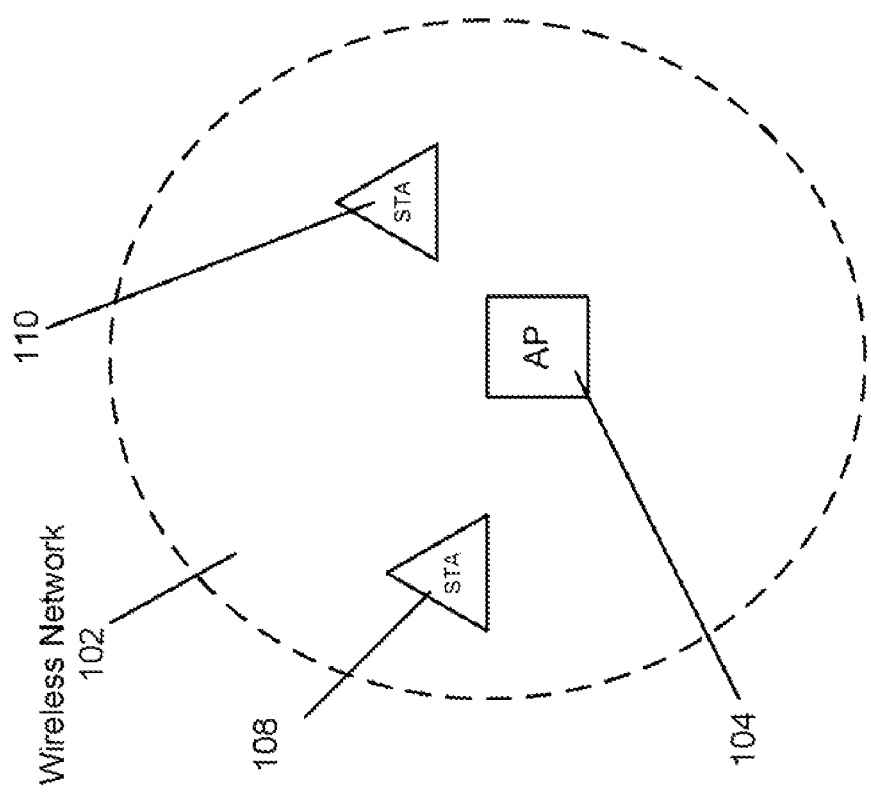
FIG. 1 is a block diagram illustrating a wireless network according to an example embodiment.

Referring to the Figures in which like numerals indicate like elements, FIG. 1 is a block diagram illustrating a wireless network 102 according to an example embodiment. Wireless network 102 may include a number of wireless nodes or stations, such as an access point (AP) 104 or base station, Relay Station (RS) and one or more mobile stations or subscriber stations, such as stations 108 and 110. While only one AP and two mobile stations are shown in wireless network 102, any number of APs, RSs and stations may be provided.

Each station in network 102 (e.g., stations 108, 110) may be in wireless communication with the AP 104, and may even be in direct communication with each other. Although not shown, AP 104 may be coupled to a fixed network, such as a Local Area Network (LAN), Wide Area Network (WAN), the Internet, etc., and may also be coupled to other wireless networks.

Wireless network 102 may include infrastructure nodes (IN), such as access points (AP), base stations (BS), relay stations (RS, explained in greater detail with reference to FIG. 2) or other infrastructure nodes. The various example embodiments may be illustrated or explained with respect to access points or base stations, but may apply to networks that use any type of infrastructure nodes (e.g., BS, AP, RS or other INs). Similarly various example embodiments may be illustrated or explained with respect to a mobile station (MS), or a MS-BS link, but may apply to networks that use any type of infrastructure nodes (e.g., AP, RS or other INs).

Figure 2:
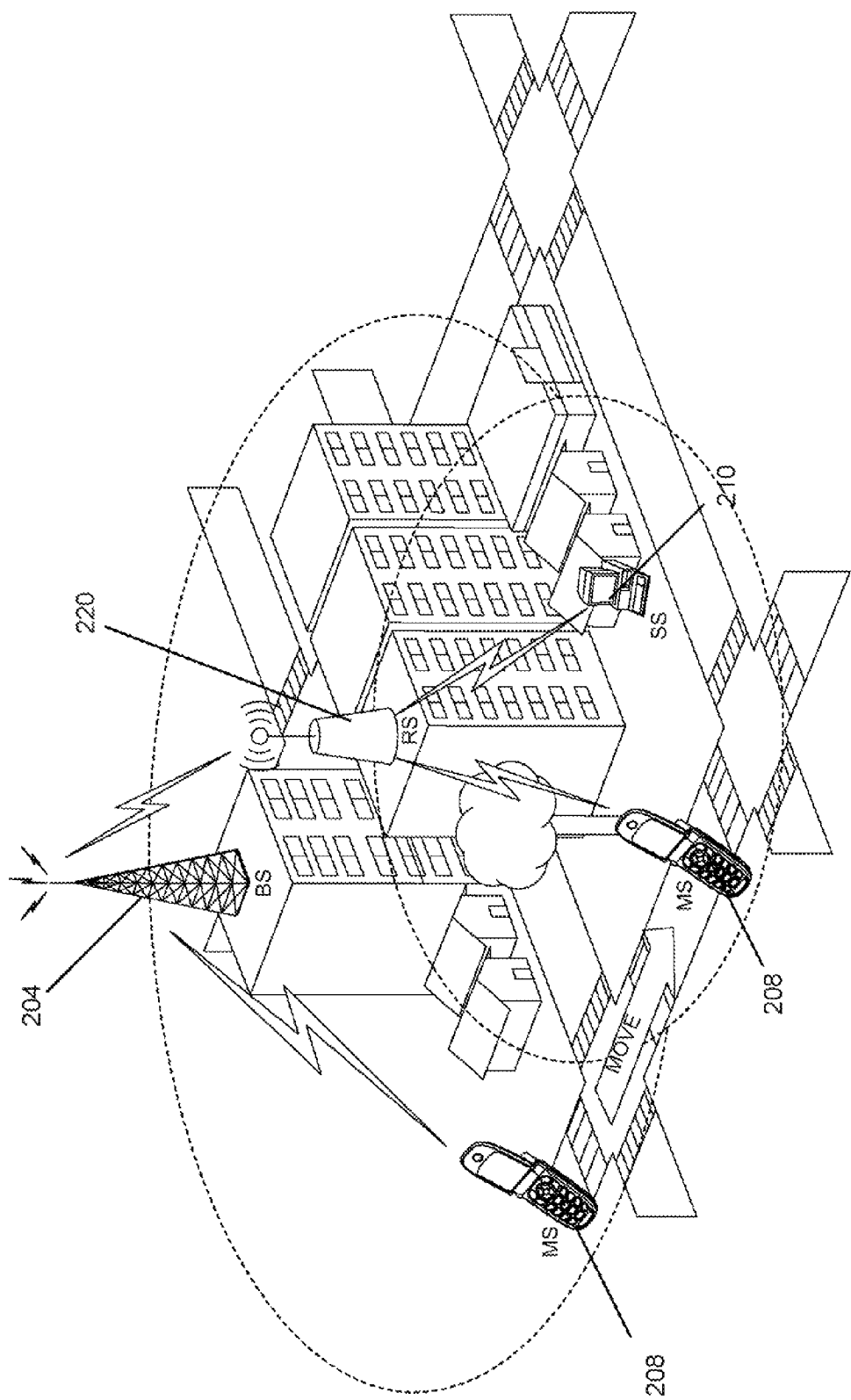
FIG. 2 is a block diagram illustrating a wireless network according to an example embodiment.

FIG. 2 is a block diagram illustrating a wireless network according to an example embodiment. A wide variety of wireless networks may be employed, including wireless networks that may employ relay stations (RSs) and other base stations or access points. According to an example embodiment, a mobile station MS 208 may initially communicate directly with a base station BS 204, for example, and a subscriber station 210 may communicate with the base station BS 204 via a relay station RS 220. In an example embodiment, the mobile station 208 may travel or move with respect to base station BS 204. For example, the mobile station MS 208 may move out of range of the base station BS 204, and may thus begin communicating with the base station 204 via the relay station 220 as shown in FIG. 2. A relay station, such as relay station 220, may increase the range of a wireless network.

Figure 3:
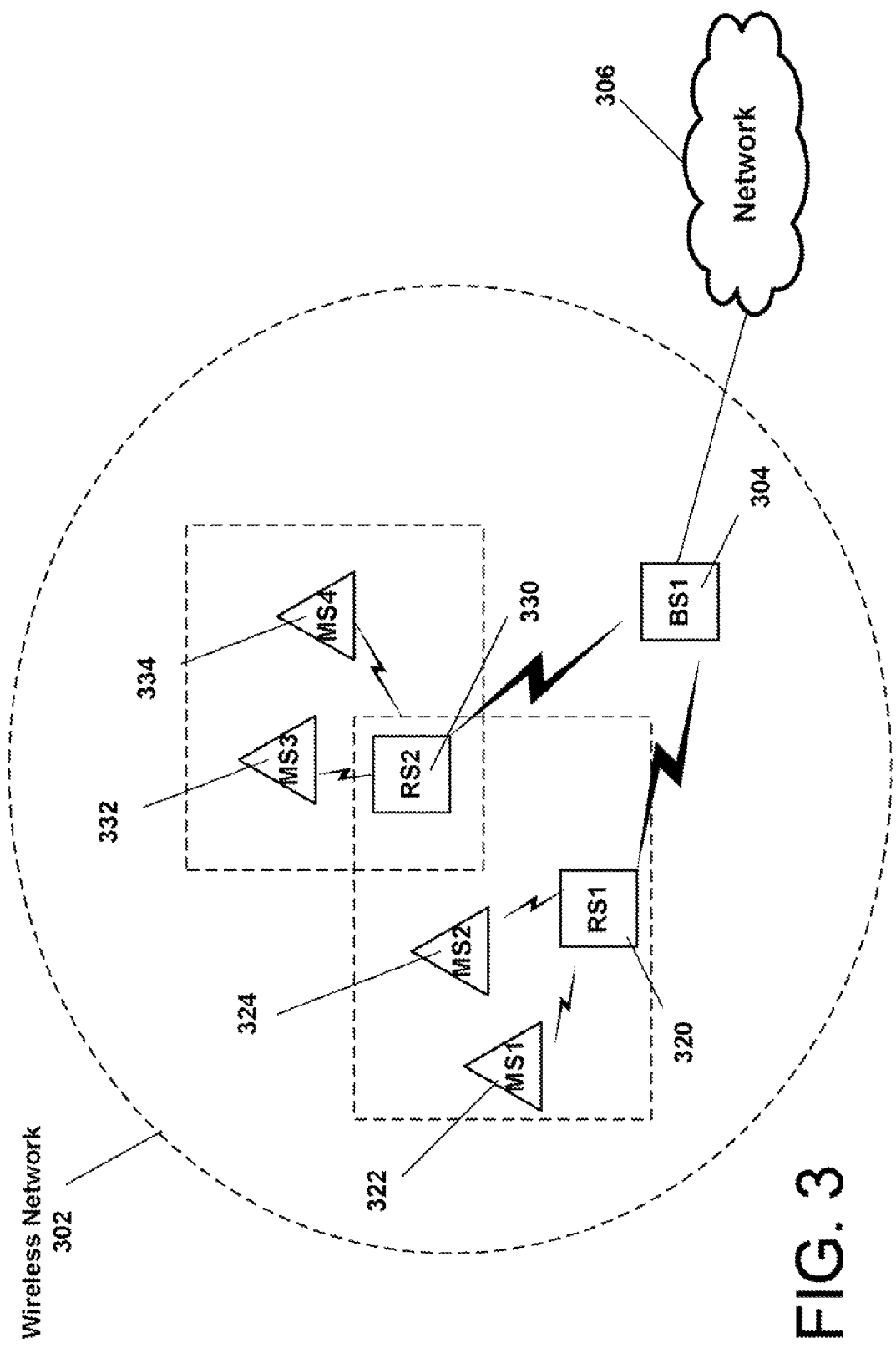
FIG. 3 is a block diagram illustrating a wireless relay network according to an example embodiment.

FIG. 3 is a block diagram illustrating a wireless network 302 according to an example embodiment. Wireless network 302 may include a number of wireless nodes or stations, such as base station BS1 304, relay stations RS1 320 and RS2 330, a group of mobile stations, such as MS 1 322 and MS2 324 communicating with (or attached to or served by) relay station RS1 320, and MS3 332 and MS4 334 communicating with (or attached to or served by) relay station RS2 330. As shown, relay stations RS1 320 and RS2 330 may be within communication range of each other, e.g., depending on a transmission power used by each. Also, relay stations RS1 320 and RS2 330 may also be able to transmit to mobile stations attached to other relay stations (or to each other), which in some cases may cause interference. While only one base station, two relay stations, and four mobile stations are shown in wireless network 302, any number of base stations, relay stations, and mobile stations may be provided. The base station 304 may be coupled to a fixed network 306, such as a Wide Area Network (WAN), the Internet, etc., and may also be coupled to other wireless networks. Mobile stations MS1 322 and MS2 324 may communicate with base station BS1 304 via relay station RS1 320, while mobile stations (or subscriber stations) MS3 332 and MS4 334 may communicate with base station BS1 304 (or access point) via relay station RS2 330, for example.

In an example embodiment, the various mobile stations/ subscriber stations such as 322, 324, 332, and 334 may include mobile or cellular telephones, wireless digital assistants (PDAs), WLAN devices or phones, WiMAX devices, or other types of wireless devices, or mobile stations. The term "node" or "wireless node" or "network node" or "network station" may refer, for example, to a wireless station, e.g., a subscriber station or mobile station, an access point or base station, a relay station or other intermediate wireless node, or other wireless computing device, as examples. Wireless node 330 may include, for example, a relay station or other node. Wireless node BS1 304 may be, for example, a base station (BS), access point (AP) or other wireless node. Wireless node 304 may be coupled to a fixed network, such as network 306, for example. Frames or traffic flowing from mobile stations (e.g., MS1 322, MS2 324, MS3 332, MS4 334) to relay stations (RS1 320, RS2 330) or from relay stations RS1 320, RS2 330 to BS1 304 may be referred to as flowing in the uplink (UL) or upstream direction, whereas frames or traffic flowing from BS1 304 to relay stations (RS1 320, RS2 330) or from relay stations RS1 320, RS2 330 to mobile stations (e.g., MS1 322, MS2 324, MS3 332, MS4 334) may be referred to as the downlink (DL) or downstream direction.

The various example embodiments described herein may be applicable to a wide variety of networks and technologies, such as WLAN networks (e.g., IEEE 802.11 type networks), IEEE 802.16 WiMAX networks, relay networks, mesh networks, 802.16 Mobile Multi-hop Relay (MMR) networks, as referenced in IEEE 802.16 WG, WiMedia networks, Ultra Wide Band networks, cellular networks, radio networks, or other wireless networks. In another example embodiment, the various examples and embodiments may be applied, for example, to a mesh wireless network, where a plurality of mesh points (e.g., Access Points) may be coupled together via wired or wireless links. The various example embodiments described herein may be applied to wireless networks, both in an infrastructure mode where an AP or base station may communicate with a station (e.g., communication occurs through APs), as well as an ad-hoc mode in which wireless stations may communicate directly via a peer-to-peer network, for example.

According to an example embodiment, a message may be transmitted or received (e.g., from a wireless node to an infrastructure wireless node, or vice versa) that includes a field (such as an authenticated checksum sequence) that may provide both authentication and error detection at a receiver node for the message (or at least a part of the message). In another example embodiment, the message may include a message body, such as a header, and a field to provide both authentication and error detection for the message body. The field (e.g., an authenticated checksum sequence) may be part of the message body, or a separate field.

The use of a (combined) field to provide both authentication of a message and allow error detection at a receiver wireless node may be used for any type of messages, and any size messages. This may provide an efficient technique to provide message authentication and error detection, for example. The use of this efficient technique to allow authentication and error detection to be performed at a receiver node for a received message may be particularly useful for the transmission of smaller-sized messages, such as control messages, management messages, etc.

For example, a wireless node in a wireless network may send a resource request message to an infrastructure node (e.g., AP, BS or RS) requesting permission or bandwidth to transmit in the uplink direction to the infrastructure node. For example, such a resource request message may be, for example, transmitted as a header, without a payload, e.g., only six bytes (or other size) in length. In an example embodiment, rather than providing a header checksum sequence as a field in the resource request message (e.g., which may provide only error detection for the resource request message), an authenticated header checksum sequence may be calculated and provided (e.g., within a header checksum sequence field of the request message or other field). The authenticated header checksum sequence may allow a receiver node to both authenticate the message (e.g., confirm that the message was sent from the alleged sending node with reasonable probability) and detect error(s) in the received message.

In an example embodiment, the transmitting wireless node and the receiving infrastructure node may negotiate the use of the authenticated header checksum sequence for one or more messages, e.g., for the resource request or other message (or for control or management message, or all messages, etc.). For example, during registration with the infrastructure node (also known as network entry), both the wireless node and the infrastructure node may indicate one or more of their capabilities, such as the capability to send or receive an authenticated checksum sequence (ACS) (e.g., an authenticated header checksum sequence).

Alternatively, rather than the sending and receiving nodes negotiating the use of an authenticated header checksum sequence (AHCS), the transmitted message may include a second field that may indicate the presence in the message of the authenticated header checksum sequence, for example. The second field may, for example, indicate whether the attached checksum sequence is a standard (non-authenticated) checksum sequence (e.g., providing error detection for the message) or an authenticated checksum sequence (e.g., providing both authentication and error detection for the message). The message or header may include the ACS or AHCS, or the AHCS may be separate from the header.

Of course, if the two nodes negotiate the use of the authenticated checksum sequence (ACS), e.g., during registration or network entry, then it is not necessary for the sending node to include the second field in the message, since the receiving node (e.g., infrastructure node) will already expect an authenticated checksum sequence (or authenticated header checksum sequence) in the message.

In another example embodiment, the use of an authenticated checksum sequence (e.g., ACS or AHCS) may be required or mandatory in some networks or in some cases. Thus, in such cases, it may be unnecessary to negotiate the use of the AHCS (or ACS), and unnecessary to include a field indicating the presence of the AHCS in the message, for example.

A wireless node/station (e.g., mobile) and an infrastructure node (e.g., BS, RS, AP or other IN) may communicate (send and receive) messages with each other that may include the authenticated checksum sequence or ACS (or authenticated header checksum sequence or AHCS). While some of the example embodiments described herein may be described as a wireless node sending a message with an AHCS to an infrastructure node, the infrastructure node may also be considered to be a sending node (sending a message with an AHCS or ACS) to the wireless node or mobile node as well. Thus, in the example of a WLAN type system, both the BS (or RS) and the MS may send and receive messages containing an authenticated header checksum sequence (AHCS), for example.

Figure 4:
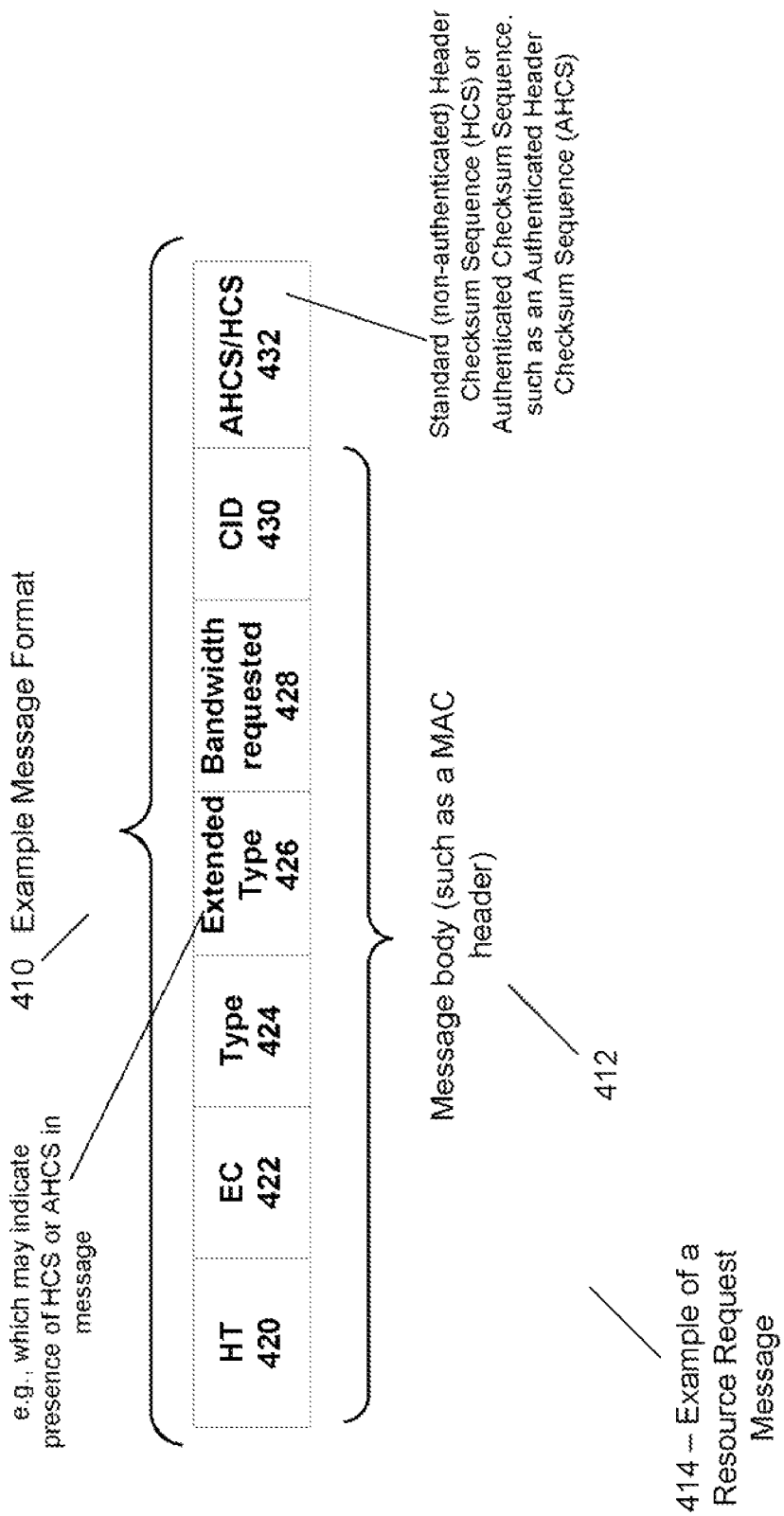
FIG. 4 is a diagram illustrating a message format according to an example embodiment.

FIG. 4 is a diagram illustrating a message format according to an example embodiment. A message 410 may include a number of fields. The message may include, for example a message body 412. In an example embodiment, the message body may be (or may include) a MAC (Media Access Control) header, but this is merely an example embodiment. Message 410, which may provide a header for the message body, may provide an example of a resource request message 414, for example. As further examples, the message 410 may be a control frame, a management frame, a bandwidth request message, such as an IEEE 802.16 bandwidth request message or an uplink request message.

Message 410 may also include an AHCS/HCS field 432 that may provide either a standard (non-authenticated) header checksum sequence (HCS) or an authenticated header checksum sequence (AHCS). For example, the AHCS/HCS field 432 may be one byte, which may be an efficient mechanism to provide both message authentication and error detection for the message 410, for example.

The message body 412 (or header) may include, for example, a header type (HT) field 420 indicating a type of header (e.g., resource request message or uplink grant request header), an EC field 422, which may indicate whether a payload is encrypted or not. In this example, this EC field 422 may not be applicable if the message body is a header only (with no payload). An extended type (ET) field 426 may indicate the presence of an authenticated checksum sequence (AHCS) in message 410. For example, ET field 426 may indicate whether the attached (e.g., header) checksum sequence in field 432 is a standard checksum sequence (e.g., providing error detection for the message or header) or an authenticated checksum sequence (providing both authentication and error detection for the message 410). While the ET field 426 may indicate presence of an AHCS within the message 410, any field or bit(s) in the message may be used for this purpose. Also, as noted above, the ET field 426 may not need to indicate presence of AHCS in the message if the use of AHCS was previously negotiated by the sending node and receiving infrastructure node. AHCS/HCS field 432 may be considered part of the header or message body, for example.

A bandwidth request field 428 may indicate the amount of bandwidth or number of bytes that the requesting node is requesting from the infrastructure node, for example (in the example embodiment where message 410 is a resource request message). A connection ID (CID) field 430 may identify the connection ID associated with (or identifying) the transmitting wireless node.

A wireless node may determine an authenticated checksum sequence (or an authenticated header checksum sequence if its over a header) using a variety of different techniques. According to an example embodiment, a wireless node may generate an authenticated checksum sequence based on the header (or message), a generator polynomial known by both sending and receiving nodes (which may also be used to generate standard or non-authenticated HCS), and a security key negotiated between the two nodes, e.g., negotiated or obtained during registration or network entry. The use of a generator polynomial may, for example, provide the error detection function (e.g., in a similar manner that a standard HCS uses a generator polynomial to allow error detection). The use of a security key (e.g., known only by both wireless nodes or negotiated between both wireless nodes) may provide the authentication function (authenticating the message) for the authenticated checksum sequence.

According to an example embodiment, a node may determine an authenticated header checksum sequence by determining a message digest over the header (or message body) and a security key, and dividing the message digest by a generator polynomial to generate a residue (or remainder). In an example embodiment, the authenticated header checksum sequence may be the residue. The node may then transmit the message (e.g., resource request message or other message) including the message body (or header) and the authenticated header checksum sequence.

At the receiving (e.g., infrastructure) node, the same calculation may be performed on the received message to generate a residue. This may include, at the receiving node: determining a message digest over the header (or message body) and the same security key, and dividing the calculated message digest by the same generator polynomial to generate a residue. The receiving node may then compare the calculated residue (calculated authenticated header checksum sequence) with the authenticated header checksum sequence included in the received message. If these two authenticated header checksum sequences match, then this both 1) authenticates the message (e.g., the message is confirmed with reasonable probability as being sent from the alleged sending node) and 2) confirms that the message has no errors in it (performing error detection). Based on a match, the receiving (e.g., infrastructure) node may send a reply to the sending node granting the requested bandwidth request, for example. Thus, the one field (e.g., AHCS, field 432) may provide both authentication and error detection, according to an example embodiment.

According to an example embodiment, the authentication may be provided with reasonable probability, and not necessarily certainty, since the limited size residue (e.g., 8-bit residue) is being used as the authenticated checksum. Thus, there may be a possibility of 1/256 (for example, depending on checksum size) that a fake (or fraudulent) message may be considered as authenticated. The use of a standard HMAC/CMAC tuple may typically require 16 bytes and may provide a higher probability of authentication (e.g., lower probability of a fake message being authenticated), due to significantly larger size, but at a very significant overhead cost. The larger (e.g., 16 byte) HMAC/CMAC tuple may be impractical for some smaller type of messages, such as small control or management frames/messages (e.g., which may be only a few bytes), for example, although the embodiments described herein are not limited to use in such smaller control/management messages. The use of an authenticated checksum (e.g., 8 bits, 16 bits or other size) may provide a reasonable compromise between overhead and authentication. This may provide reasonable authentication at a reasonable risk, e.g., especially for messages that do not contain extremely sensitive user information/identity, although the authenticated checksum and other embodiments described herein may be used in those type of messages (or any messages) as well.

The use of an AHCS may be optional for wireless nodes in one example embodiment. This may allow attackers to submit fraudulent bandwidth requests, and thereby occupy all the available resources or create denial of service (DoS) attack by sending a 0 byte resource request on behalf of a valid user (wireless node). In the event that an infrastructure node detects that more than a threshold percentage of resources (e.g., uplink bandwidth) has been allocated, then the infrastructure node may, for example, reject (or begin rejecting) resource requests in messages that do not include an authenticated checksum sequence, although this is merely another example embodiment. Or, the infrastructure node may disassociate (or remove from the network service) with nodes that are not using the authenticated checksum sequences for communications or resource requests, etc., which may limit the impact from a DoS attack.

In another example embodiment, if the use of authenticated checksum sequences are required for one or more messages (e.g., resource requests), then, for example, it may not be necessary for the two nodes to negotiate the use of an AHCS or for the sending node to include a field indicating the presence of the AHCS in the message.

According to an example embodiment, any security key may be used. For example, a security association may be obtained (or negotiated) between the two nodes (sending wireless node and receiving or infrastructure node), e.g., during registration or network entry. The security association may include a number of keys, such as traffic encryption key (TEK), or other key, which may be used to generate the authenticated checksum sequence.

In addition, any type of message digest may be used, such as any cryptographic hash algorithm, a Hashed Message Authentication Code (HMAC), a Cipher-based MAC (CMAC), or other message digest.

In addition, any generator polynomial known by both nodes, may be used, such as ($D^8+D^2+1$). However, this is merely an example and any generator polynomial may be used. In an example embodiment, the same (or one) generator polynomial may be used for both the standard (non-authenticated) header checksum sequence (HCS) and the authenticated header checksum sequence (AHCS).

In an example embodiment, an authenticated header checksum sequence (AHCS) may be calculated as:

$$AHCS=HMAC\ [(security\ key)\ XOR\ (counter)\ AND\ header]\ mod\ (generator\ polynomial)$$

where security key may refer to a security key (e.g., TEK or other key) known by both nodes or negotiated by the wireless or mobile node during registration or network entry. The header refers to the message or header for which authentication and error detection capability is being provided by the AHCS. The generator polynomial may refer to the polynomial known by both nodes, e.g., to provide error detection for the message. Counter may refer to an increasing number, such as a monotonically increasing value which may be of the same bit length as the security key. Counter may also be a pseudo-random number, which may be determined by both nodes. XOR refers to an Exclusive OR operation.

XORing the security key with the counter may, for example, make it more difficult for an attacker or fraudulent node to find an AHCS collision and replay the message for the bandwidth request. Thus, even though a limited numbers of bits (e.g., 8 bits) may be used for the AHCS, the use of the counter (although not required of course) may make it more difficult for a would be attacker to generate and send a message that includes a correct (e.g., authenticated) AHCS. This may, for example, decrease the likelihood of a denial of service attack (or other attack) against a wireless network.

According to another example embodiment, an authenticated header checksum sequence (AHCS), or ACS (authenticated checksum sequence for any message) may be calculated as, in another illustrative example:

$$AHCS=[D^8*HMAC\ (TEK \otimes counter,\ 5\text{-byte header or message body})]mod(D^8+D^2+D+1),$$

where the comma indicates AND operation, and $\otimes$ indicates Exclusive OR (XOR) operation, and mod indicates modulo operation (or division and taking the residue or remainder).

According to an example embodiment, the same parameters (e.g., type of message digest, security key, polynomial) used by the sending node to generate the AHCS for transmission may also be typically used at the receiving node to re-calculate the AHCS, for comparison to the received AHCS for the receiving node to perform authentication and error detection on the received message.

Figure 6:
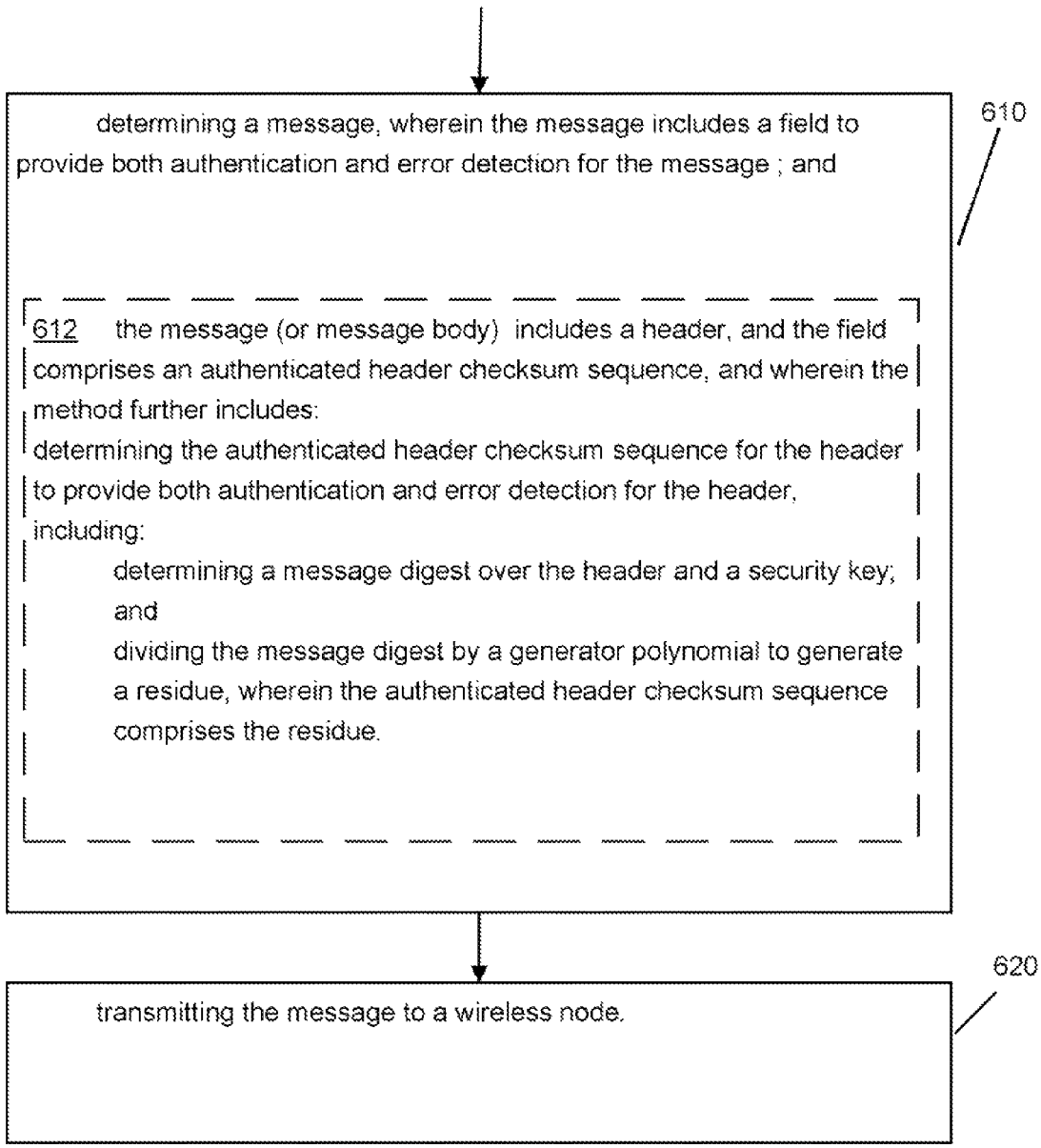
FIG. 6 is a flow chart illustrating operation of a wireless node according to an example embodiment.

FIG. 6 is a flow chart illustrating operation of a wireless node according to an example embodiment. At 610, a message may be determined, wherein the message may include a field to provide both authentication and error detection for the message, or at least for a portion of the message. For example, the message may include a message body and a field to provide both authentication and error detection for the message body.

In an example embodiment, operation 610 may further include operation 612. At 612, the authenticated header checksum sequence may be determined for the header to provide both authentication and error detection for the header. This may include determining a message digest over the header and a security key, and dividing the message digest by a generator polynomial to generate a residue, wherein the authenticated header checksum sequence comprises the residue.

At 620, the message may be transmitted, e.g., transmitted to a wireless node such as an infrastructure node or other node.

In an example embodiment, the message body may be a header, and the authenticated checksum sequence may include an authenticated header checksum sequence to provide authentication and error detection for the header (or the message), for example. In an example embodiment, the message may also include another field indicating a presence of the authenticated header checksum sequence in the message.

In another example embodiment, the method of FIG. 6 may also include determining a security key for communicating with an infrastructure node and determining the authenticated header checksum sequence for the header to provide both authentication and error detection for the header. Determining the authenticated header checksum sequence may include determining a message digest over the header and the security key, and dividing the message digest by a generator polynomial to generate a residue. The authenticated header checksum sequence may include the residue.

In another example embodiment, determining the authenticated header checksum sequence may include, for example, determining a message authentication code (MAC) over [(the security key XOR with a counter) and the header] to generate a MAC result, and dividing the MAC result by a generator polynomial to generate a residue, wherein the authenticated header checksum sequence comprises the residue.

Similarly, an apparatus may be provided that includes, for example, a processor (or controller), memory and a wireless transceiver. For example, the processor may be configured to transmit a message including a field (such as, for example, an authenticated header checksum sequence or AHCS) that may provide both authentication and error detection for the message (or at least for a portion of the message). For example, the processor may be configured to transmit a message including a message body (such as a header) and a field (such as, for example, an authenticated header checksum sequence or AHCS) to provide both authentication and error detection for the message body. In an example embodiment, the message may also include a second field indicating a presence in the message of the field providing both authentication and error detection for the message body.

The message may include a control or management frame transmitted to an infrastructure node, such as a base station, access point or relay station. The message may include, for example, a resource request message, a bandwidth request message, or an uplink request message. For example, the message body may include an IEEE 802.16 bandwidth request header, In an example embodiment, the processor may be configured to determine an authenticated header checksum sequence for the header to provide both authentication and error detection for the header. The authenticated header checksum sequence may be determined by the processor being configured to determine a message digest over the header and a security key and divide the message digest by a generator polynomial to generate a residue, where the authenticated header checksum sequence comprises the residue. The processor may also transmit the message, the message including the header and the authenticated header checksum sequence.

The processor may alternatively be configured to determine an authenticated header checksum sequence for the header to provide both authentication and error detection for the header. The authenticated header checksum sequence may be determined by the processor, where the processor is configured to determine a message authentication code (MAC) over [(the security key XORed with a counter) and the header] to generate a MAC result and divide the MAC result by a generator polynomial to generate a residue, where the authenticated checksum sequence includes the residue.

Figure 7:
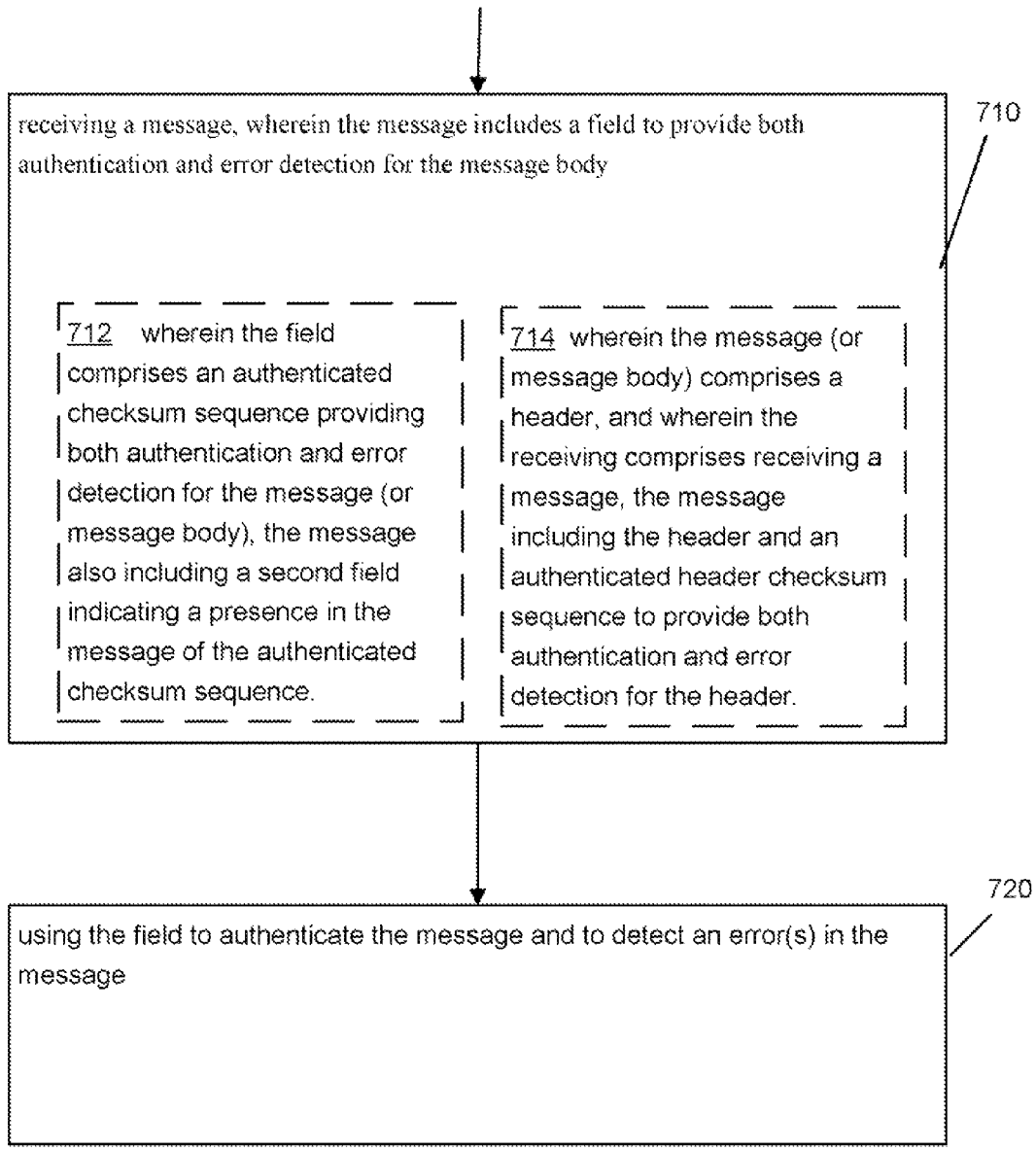
FIG. 7 is a flow chart illustrating operation of a wireless node according to an example embodiment.

FIG. 7 is a flow chart illustrating operation of a wireless node according to an example embodiment. FIG. 7 may illustrate operation of a wireless node, such as an infrastructure node, for example. At 710, a message may be received that includes a message, including a field (such as an ACS or AHCS) that provides (or allows) for authentication and error detection for the received message. For example, a message may be received that includes a message body and a field to provide both authentication and error detection for the message body. In an example embodiment, operation 710 may include operations 712 or 714, for example.

At 712, the field may include an authenticated checksum sequence providing both authentication and error detection for the message (or message body). The message may also include a second field indicating a presence in the message of the authenticated checksum sequence.

At 714, the message body may include a header. Receiving the message may include, for example, receiving the message including the header and an authenticated header checksum sequence to provide both authentication and error detection for the header.

At 720, the wireless node may use the field (e.g., the authentication header checksum sequence) to authenticate the message and to detect error(s) in the message.

Figure 8:
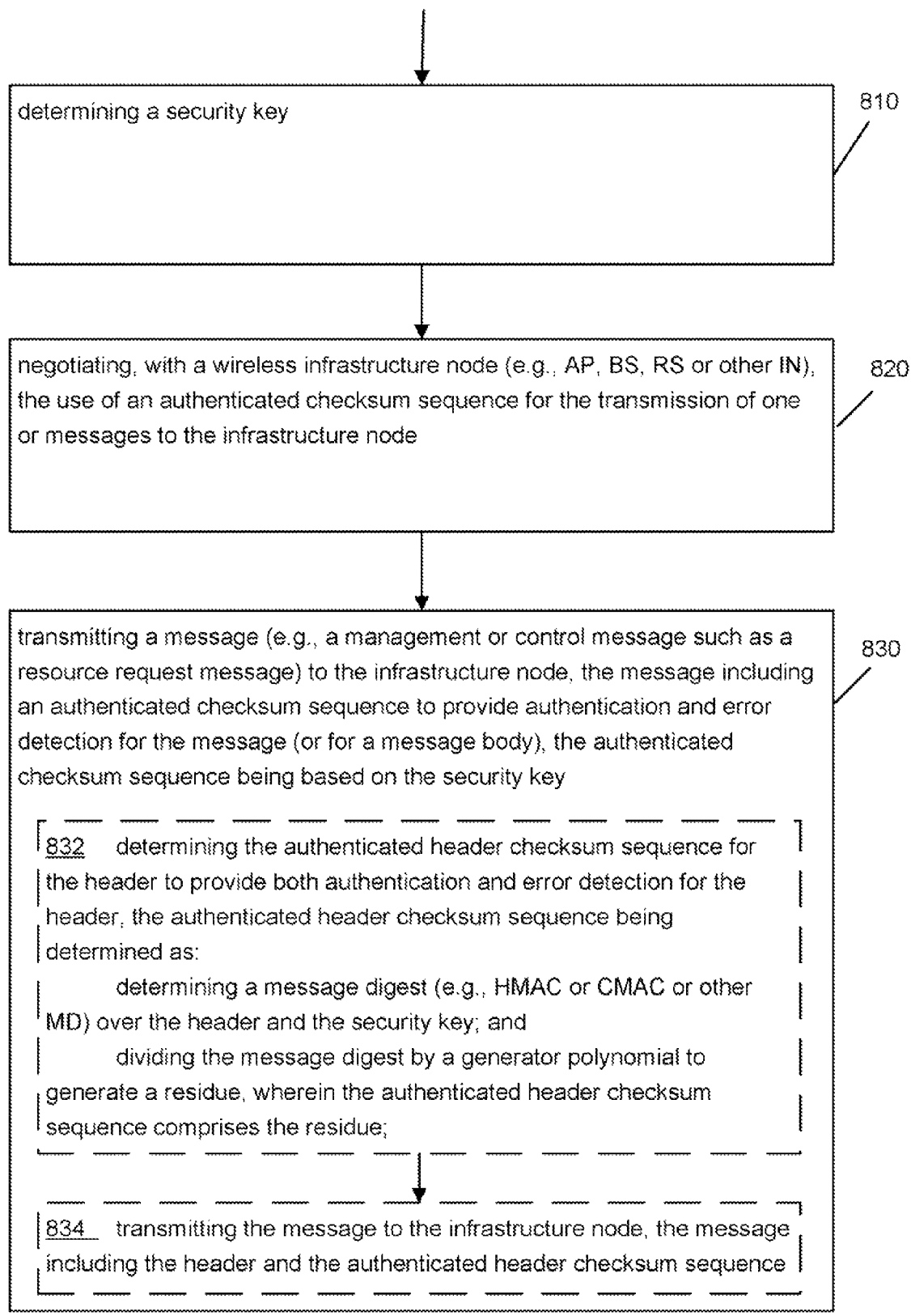
FIG. 8 is a flow chart illustrating operation of a wireless node according to an example embodiment.

FIG. 8 is a flow chart illustrating operation of a wireless node according to an example embodiment. At 810, a security key may be determined (e.g., via negotiation, or via registration or network entry).

At 820, the use of an authenticated checksum sequence (such as an authenticated header checksum sequence) for transmission of one or more messages may be negotiated with a wireless infrastructure node.

At 830, a message (e.g., a management or control message such as a resource request message) may be transmitted to the infrastructure node, the message including an authenticated checksum sequence to provide authentication and error detection for the message, and the authenticated checksum sequence may be based on the security key. In an example embodiment, the message may include a message body and an authenticated checksum sequence to provide authentication and error detection for the message body, the authenticated checksum sequence being based on the security key In an example embodiment, operation 830 may include operations 832 or 834, for example.

Operation 832 may include, for example, determining the authenticated header checksum sequence for the header (or message) to provide both authentication and error detection for the header. The authenticated header checksum sequence may be determined by determining a message digest (e.g., HMAC or CMAC or other MD) over the header and the security key and dividing the message digest by a generator polynomial to generate a residue. In the example method of FIG. 8, the authenticated header checksum sequence may include the residue.

Operation 834 may include transmitting the message to the infrastructure node, the message including the header and the authenticated header checksum sequence.

Similarly, an apparatus may be provided that may include, for example, a wireless transceiver, a memory, and a processor. The processor may be configured to determine a security key, negotiate, with a wireless infrastructure node, the use of an authenticated checksum sequence for the transmission of one or more messages to the infrastructure node, and transmit a message to the infrastructure node. The message may include a message body (such as a header or other message body) and an authenticated checksum sequence to provide authentication and error detection for the message body. The authenticated checksum sequence may be based on the security key.

According to another example embodiment, a chipset may include a wireless transceiver, and a processor and/or other components or chips. The processor may be configured to transmit and/or receive a message. The message may include a field to provide both authentication and error detection for the message. In an example embodiment, the processor may be configured to transmit and/or receive a message including an authenticated checksum sequence (e.g., such as an authenticated header checksum sequence) to provide both authentication and error detection for the message.

Figure 5:
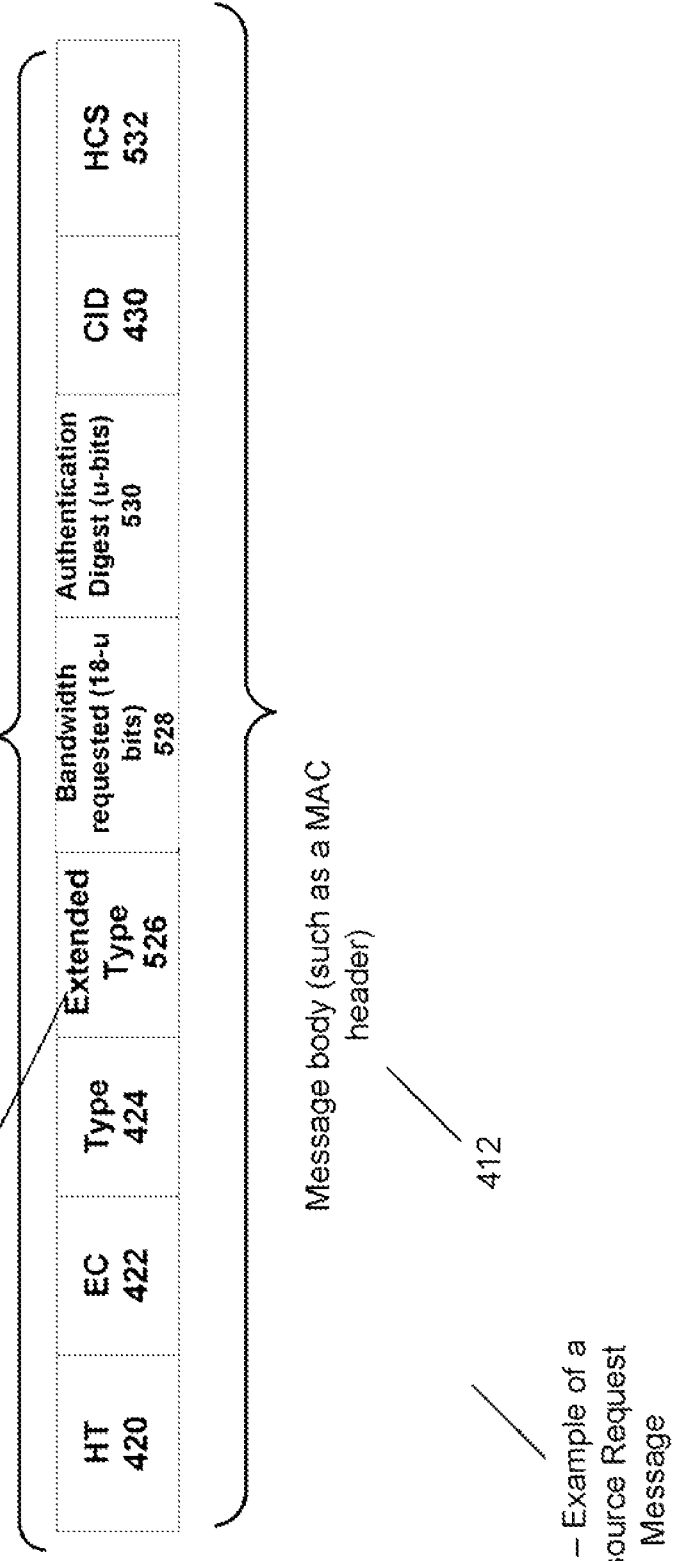
FIG. 5 is a diagram illustrating a message format according to another example embodiment.

FIG. 5 is a diagram illustrating a message format according to another example embodiment. The example message 510, may be similar to the message 410 illustrated in FIG. 4, with differences noted here. In an example embodiment, the extended type (ET) field may indicate the presence of an authentication digest in message 510. A u-bit field, shown as authentication digest 530, may be provided to provide authentication of message 510. Authentication digest 530, may be any size, e.g., 3 or 4 bits or other size. Thus, for example, a relatively small (or any) number of bits may be used, in some cases, to provide some level of authentication for the message 510, which may be particularly useful for small-sized messages, such as control or management message, resource request message, etc.

In an example embodiment, a portion of the bits (e.g., u-bits) of an existing field (e.g., from bandwidth requested field 528) may be allocated and used to provide an authentication digest to allow authentication of the message. For example, the bandwidth requested field 528 may be, for example 18 bits, and 4 of the 18 bits may be allocated for the authentication digest 530. This is merely another example, and is not required. Thus, this technique may allow for efficient authentication for a message. A header checksum sequence 532 may also be provided for error detection.

In an example embodiment, the authentication digest 530 may be provided as a u-bit pseudo-random number, which may be provided as an authentication digest, e.g., provided in each uplink grant request or resource request from a wireless node/station to an infrastructure node to authenticate the request.

In another example embodiment, the u-bit authentication digest 530 may be calculated or determined by calculating a message digest (e.g., HMAC, CMAC or other MD) over the header (or message body) and a security key, and dividing the message digest by $2^u$ to generate a u-bit residue (or remainder). In an example embodiment, the authentication digest may be the u-bit residue. The node may then transmit the message (e.g., resource request message or other message) including the message body (or header) and the authentication digest.

For example, the u-bit authentication digest may be calculated as: [HMAC (TEK$\otimes$counter, header or message body)

mod $2^u$], to generate the u-bit residue. This authentication calculation is similar to that described above for FIG. 4. This is merely an example, and other techniques may be used.

Figure 9:
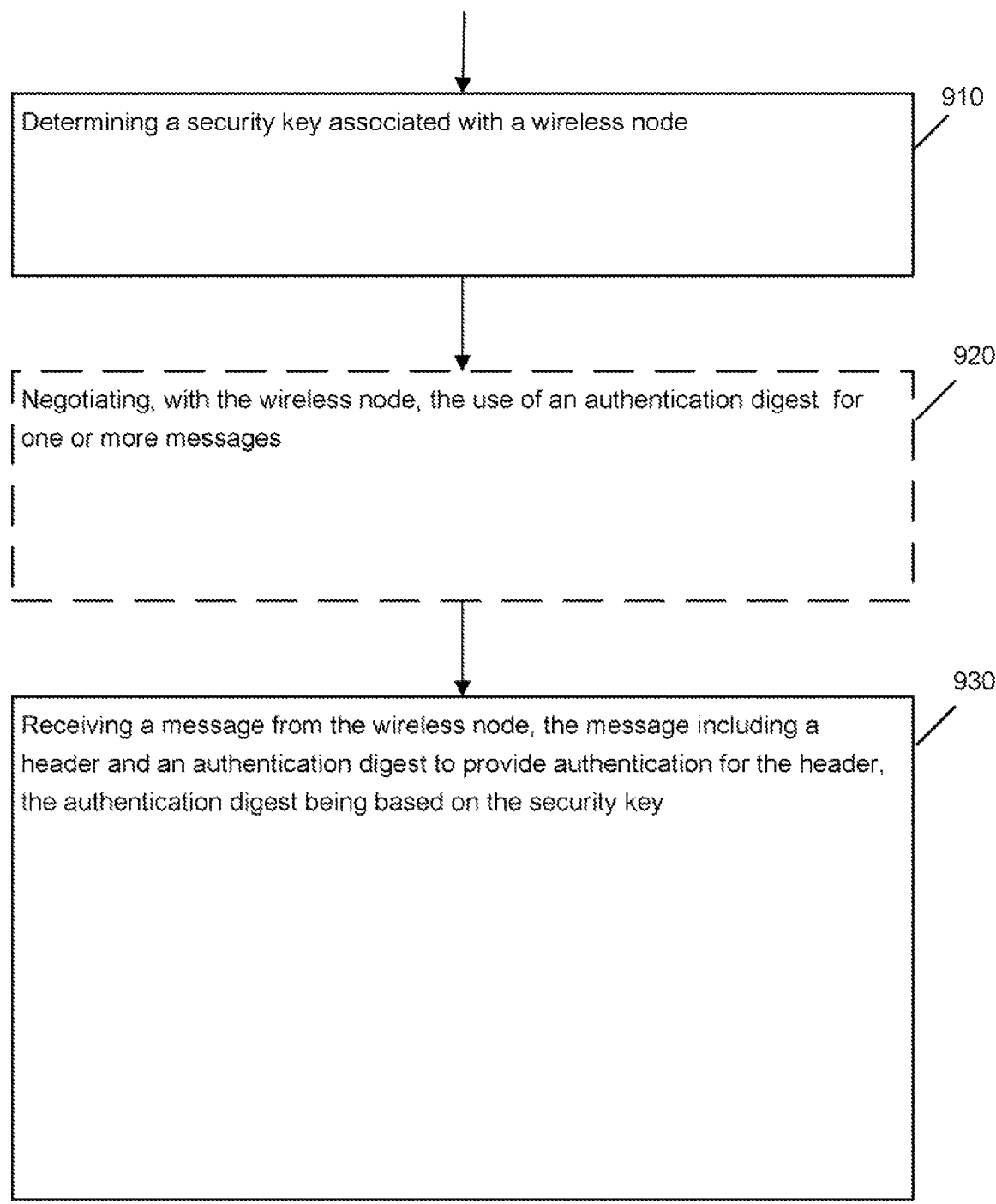
FIG. 9 is a flow chart illustrating operation of a wireless node according to an example embodiment in which an authentication digest may be used to provide authentication.

FIG. 9 is a flow chart illustrating operation of a wireless node according to an example embodiment in which an authentication digest may be used to provide authentication. The flow chart of FIG. 9 may describe the operation of a wireless node, such as an infrastructure node. At 910, a security key associated with a wireless node is determined (e.g., via negotiation, or via registration or network entry). The security key (e.g., TEK) may be provided as part of a security association for a wireless node, for example.

At 920, although not required, the use of an authentication digest for one or more messages may be negotiated with the wireless node. Alternatively, a field in the message may indicate the presence of the authentication digest in the message, or it may be understood by the nodes or required for one or more messages (e.g., there may be no need to negotiate the use of the authentication digest or include a field indicating presence of the authentication digest, for example).

At 930, a message may be received from the wireless node, the message including a header and an authentication digest to provide authentication for the header. In an example embodiment, the authentication digest may be based on the security key, or may be a pseudo-random number or other value.

Similarly, an apparatus may be provided that may include a wireless transceiver, memory and/or a processor. The processor (or controller) may be configured to: receive a message via a wireless medium including a header and an authentication digest to provide authentication for the header. An authentication digest may be calculated, e.g., based on the security key and the header, and compared to the received authentication digest to authenticate the received message.

In an example embodiment, the header may include an additional field that may indicate the presence of the authentication digest in the message. The message may be, for example a control or management message, a resource request message, an IEEE 802.16 uplink grant message, or other message.

Figure 10:
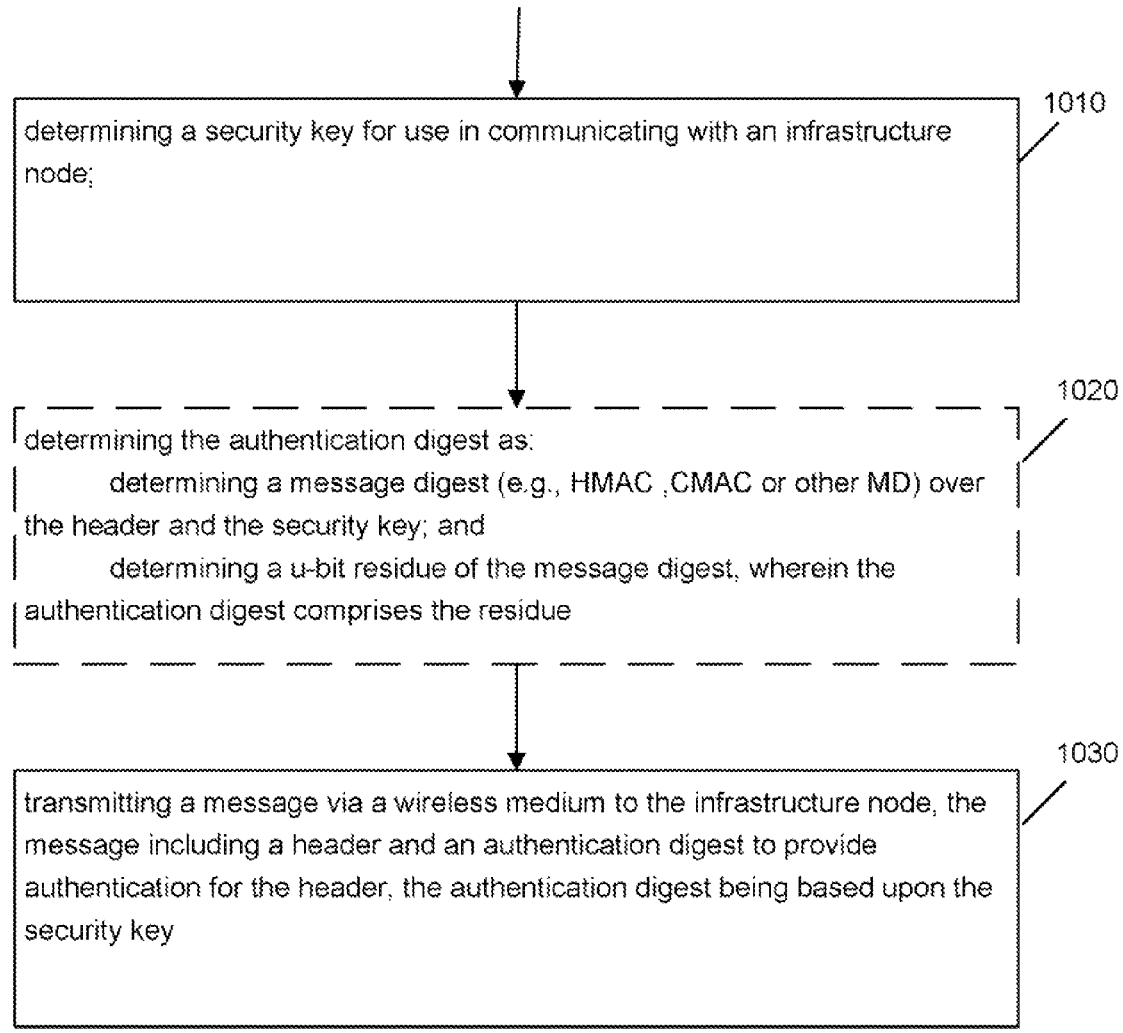
FIG. 10 is a flow chart illustrating operation of a wireless node according to another example embodiment in which an authentication digest may be used to provide authentication.

FIG. 10 is a flow chart illustrating operation of a wireless node according to another example embodiment in which an authentication digest may be used to provide authentication.

At 1010, a security key may be determined for use in communicating with an infrastructure node.

At 1020, the authentication digest may be determined by determining a message digest (e.g., HMAC, CMAC or other MD) over the header and the security key and determining a u-bit residue of the message digest, where the authentication digest may include the residue.

At 1030, the message may be transmitted via a wireless medium to the infrastructure node, the message including a header and the authentication digest to provide authentication for the header, the authentication digest being based upon the security key.

Similarly, an apparatus may be provided that may include a processor, which may be configured to: determine a security key for use in communicating with an infrastructure node, and transmitting a message via a wireless medium to the infrastructure node. The message may include a header and an authentication digest to provide authentication for the header. The authentication digest may be based on the security key, in an example embodiment.

Figure 11:
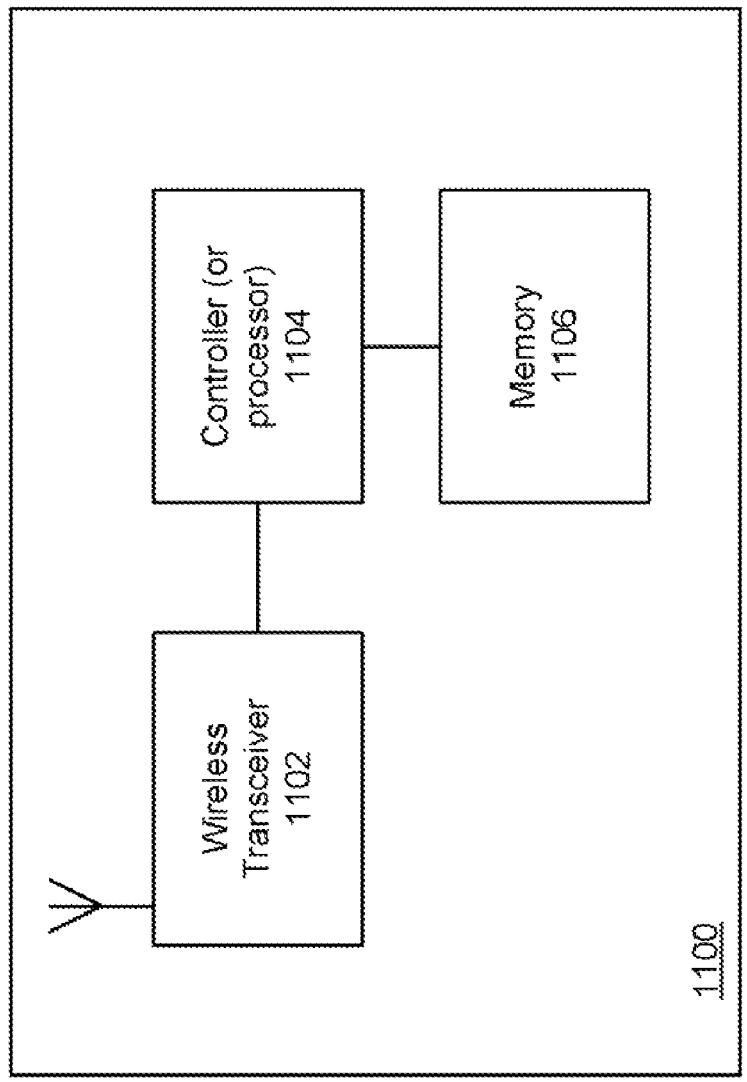
FIG. 11 is a block diagram illustrating an apparatus that may be provided in a wireless node according to an example embodiment.

FIG. 11 is a block diagram illustrating an apparatus 1100 that may be provided in a wireless node according to an example embodiment.

The wireless node (e.g. station or AP) may include, a chipset that may include a number of chips or components or functional blocks. The wireless node (or chipset) may, for example, include a wireless transceiver 1102 to transmit and receive signals, a controller (or processor) 1104 to control operation of the station and execute instructions or software, and a memory 1106 to store data and/or instructions.

Controller (which may also be referred to as a processor) 1104 may be programmable and capable of executing software or other instructions stored in memory or on other computer media to perform the various tasks and functions described above, such as one or more of the tasks, techniques or methods described herein.

In addition, a storage medium (memory) 1106 may be provided that includes stored instructions, when executed by a controller or processor that may result in the controller (or processor) 1104, or other controller or processor, performing one or more of the functions or tasks described herein.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

While certain features of the described implementations have been illustrated as described herein, many modifications, substitutions, changes and equivalents will now occur to those skilled in the art.

What is claimed is:

1. An apparatus adapted for wireless communication in a wireless network, the apparatus comprising:
    a processor, the processor being configured to transmit a message, the message including a message body and a field to provide both authentication and error detection for the message, wherein the message body comprises a header, the processor being further configured to determine, during one of a registration and a network entry for a wireless node, a security key associated with the wireless node, and
    wherein the processor being configured to transmit comprises the processor being configured to:
        determine an authenticated header checksum sequence for the header to provide both authentication and error detection for the header, the processor being configured to determine the authenticated header checksum sequence including being configured to:

determine a message authentication code (MAC) over [(the security key XORed with a counter) and the header] to generate a MAC result; and divide the MAC result by a generator polynomial to generate a residue, wherein the authenticated checksum sequence comprises the residue.

2. The apparatus of claim 1, wherein the message also includes a field indicating a presence in the message of the field providing both authentication and error detection for the message.

3. The apparatus of claim 1, wherein the header comprises a Media Access Control header.

4. The apparatus of claim 1, wherein the message comprises one of a control frame and a management frame transmitted to one of an infrastructure node, a base station and an access point.

5. The apparatus of claim 1, wherein the message comprises one of a resource request message, a bandwidth request message and an uplink request message.

6. The apparatus of claim 1, wherein the header comprises an IEEE 802.16 bandwidth request header.

7. An apparatus adapted for wireless communication in a wireless network, the apparatus comprising:
a processor, the processor being configured to transmit a message, the message including a message body and a field to provide both authentication and error detection for the message, wherein the processor being configured to transmit comprises the processor being configured to:
determine an authenticated checksum sequence for the message body to provide both authentication and error detection for the message body, the processor being configured to determine the authenticated checksum sequence including being configured to:
determine a message digest over the message body and a security key; and
divide the message digest by a checksum generator polynomial to generate a residue, wherein the authenticated checksum sequence comprises the residue; and
transmit the message, the message including the authenticated checksum sequence.

8. A method comprising:
determining a message, wherein the message includes a message body and a field to provide both authentication and error detection for the message; and
transmitting the message to a wireless node,
wherein the message body comprises a header and the field comprises an authenticated header checksum sequence, and wherein the method further comprises:
determining the authenticated header checksum sequence for the header to provide both authentication and error detection for the header, including:
determining a message digest over the header and a security key; and
dividing the message digest by a generator polynomial to generate a residue, wherein the authenticated header checksum sequence comprises the residue.

9. The method of claim 8, wherein the message also includes a second field indicating a presence in the message of the field providing both authentication and error detection for the message.

10. The method of claim 8, further comprising determining the security key for communicating with an infrastructure node.

11. The method of claim 8, wherein the determining the authenticated header checksum sequence comprises:

determining a message authentication code (MAC) over [(the security key XORed with a counter) and the header] to generate a MAC result;
dividing the MAC result by a generator polynomial to generate a residue, wherein the authenticated header checksum sequence comprises the residue.

12. The method of claim 8, wherein the determining the authenticated header checksum sequence comprises:
determining a message authentication code (MAC) over [(the security key XORed with a counter) and the header] to generate a MAC result; and
dividing the MAC result by a generator polynomial to generate a residue, wherein the authenticated header checksum sequence comprises the residue.

13. A method comprising:
receiving a message, wherein the message includes a message body and a field to provide both authentication and error detection for the message body;
using the field to authenticate the message and to detect any errors in the message;
determining a security key associated with a wireless node; and
negotiating, with the wireless node, the use of an authenticated checksum sequence for one or messages,
wherein respective authenticated checksum sequences of each of the one or more messages are based on the security key.

14. The method of claim 13, wherein the field comprises the authenticated checksum sequence, the authenticated checksum sequence providing both authentication and error detection for the message body, the message also including a second field indicating a presence in the message of the authenticated checksum sequence.

15. The method of claim 13, wherein the message body comprises a header, and wherein the receiving comprises receiving the message, the message including the header and the authenticated header checksum sequence to provide both authentication and error detection for the header.

16. An apparatus adapted for wireless communication in a wireless network, the apparatus comprising:
a wireless transceiver; and
a processor, the processor being configured to:
determine a security key;
negotiate, with a wireless infrastructure node, the use of authenticated checksum sequences for the transmission of one or messages to the infrastructure node; and
transmit a message to the infrastructure node, the message including a message body and an authenticated checksum sequence to provide authentication and error detection for the message body, the authenticated checksum sequence being based on the security key.

17. The apparatus of claim 16, wherein the message body comprises a header, and wherein the authenticated checksum sequence comprises an authenticated header checksum sequence to provide authentication and error detection for the header.

18. The apparatus of claim 16, wherein the message body comprises a header, and the authenticated checksum sequence comprises an authenticated header checksum sequence, and wherein the processor being configured to transmit comprises the processor being configured to:
determine the authenticated header checksum sequence for the header to provide both authentication and error detection for the header, the processor being configured to determine the authenticated header checksum sequence including being configured to:
   determine a message digest over the header and the security key; and
   divide the message digest by a generator polynomial to generate a residue,
wherein the authenticated header checksum sequence comprises the residue; and transmit the message to the infrastructure node, the message including the header and the authenticated header checksum sequence.

19. The apparatus of claim 16, further comprising:
a wireless transceiver coupled to the processor; and
a memory coupled to the processor.

* * * * *

UNITED STATES PATENT AND TRADEMARK OFFICE
CERTIFICATE OF CORRECTION

| | | |
|---|---|---|
| PATENT NO. | : 8,036,133 B2 | Page 1 of 1 |
| APPLICATION NO. | : 12/041564 | |
| DATED | : October 11, 2011 | |
| INVENTOR(S) | : Shashikant Maheshwari et al. | |

It is certified that error appears in the above-identified patent and that said Letters Patent is hereby corrected as shown below:

On Title page, in Item (56), under "OTHER PUBLICATIONS", column 2, line 8, delete "Authenticaiton"," and insert -- Authentication", --, therefor.

IN THE CLAIMS:

In column 16, line 25, in claim 13, after "or" insert -- more --.

In column 16, line 48, in claim 16, after "or" insert -- more --.

Signed and Sealed this
Thirty-first Day of January, 2012

David J. Kappos
*Director of the United States Patent and Trademark Office*